US012743839B2

(12) United States Patent
Liljeros et al.

(10) Patent No.: US 12,743,839 B2
(45) Date of Patent: Sep. 22, 2026

(54) PAGE MANAGEMENT AND FORWARD PROGRESS FOR RAY TRACING

(71) Applicant: Apple Inc., Cupertino, CA (US)

(72) Inventors: Frank W. Liljeros, Sanford, FL (US); Karl D. Mann, Orlando, FL (US); Per Christian Corneliussen, Orlando, FL (US)

(73) Assignee: Apple Inc., Cupertino, CA (US)

( * ) Notice: Subject to any disclaimer, the term of this patent is extended or adjusted under 35 U.S.C. 154(b) by 202 days.

(21) Appl. No.: 18/509,902

(22) Filed: Nov. 15, 2023

(65) Prior Publication Data

US 2025/0095273 A1 Mar. 20, 2025

Related U.S. Application Data

(60) Provisional application No. 63/584,021, filed on Sep. 20, 2023.

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01)

(58) Field of Classification Search
CPC ......... G06T 15/06; G06T 15/005; G06T 1/60; G06F 9/5016
See application file for complete search history.

(56) References Cited

U.S. PATENT DOCUMENTS

| | | | | |
|---|---|---|---|---|
| 2015/0242990 | A1 | 8/2015 | Peterson et al. | |
| 2021/0271606 | A1* | 9/2021 | Hensley | G06F 12/1018 |
| 2021/0295583 | A1* | 9/2021 | Vaidyanathan | G06T 15/005 |
| 2022/0036639 | A1* | 2/2022 | Rabbani Rankouhi | G06T 17/005 |
| 2022/0050790 | A1* | 2/2022 | Goodman | G06F 12/109 |
| 2022/0188965 | A1 | 6/2022 | Li et al. | |
| 2023/0144553 | A1* | 5/2023 | Damani | G06F 9/3009 718/102 |
| 2025/0053452 | A1* | 2/2025 | Majewski | G06F 9/5027 |

* cited by examiner

*Primary Examiner* — Devona E Faulk
*Assistant Examiner* — Donna J. Ricks
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to memory page allocation for graphics processor. In some embodiments, a shader program includes a primary thread associated with ray tracing (that includes an instruction that indicates for the apparatus to launch one or more secondary threads). Memory resource allocator circuitry may receive a request to allocate a memory page in a page pool to a thread of the shader program, where the page pool includes a set of protected pages and a set of public pages. The allocator may allocate a page of the page pool to the requesting thread according to an allocation restriction, such that protected pages are allocable only to secondary threads that are launched based on a primary thread and public pages are allocable to both primary and secondary threads.

20 Claims, 10 Drawing Sheets

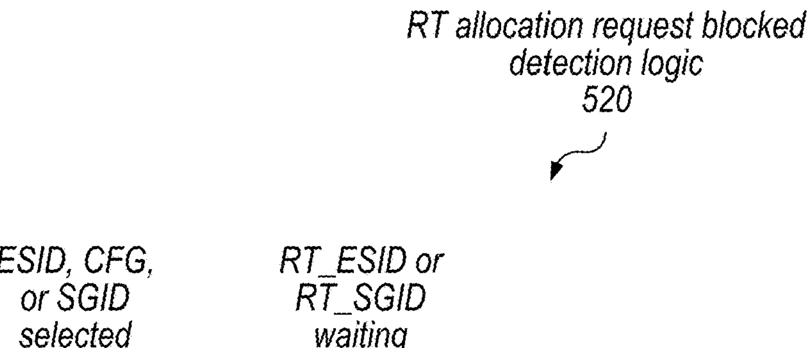
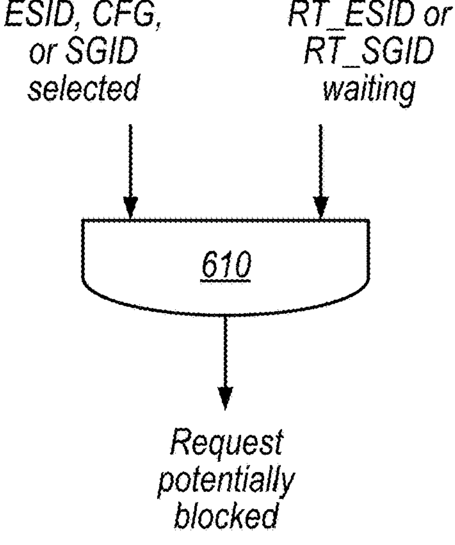
FIG. 6
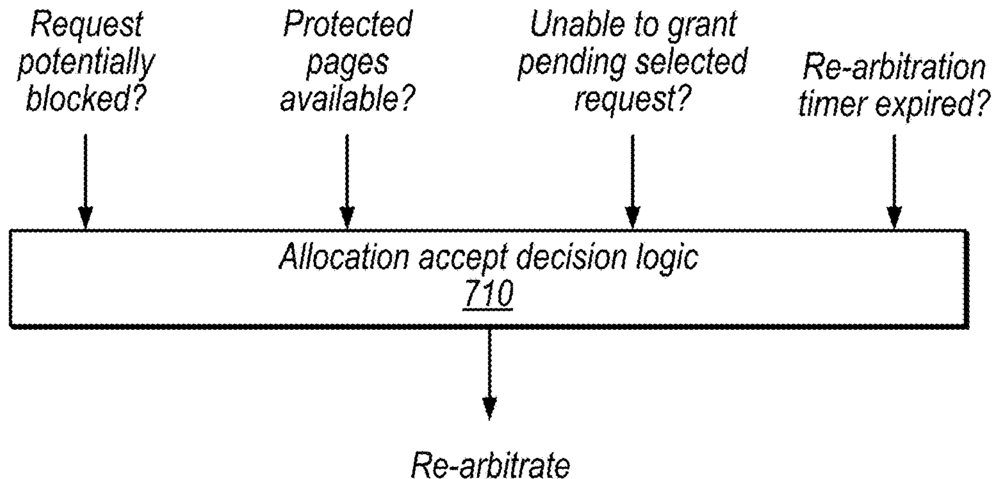
FIG. 7

Figure 8:
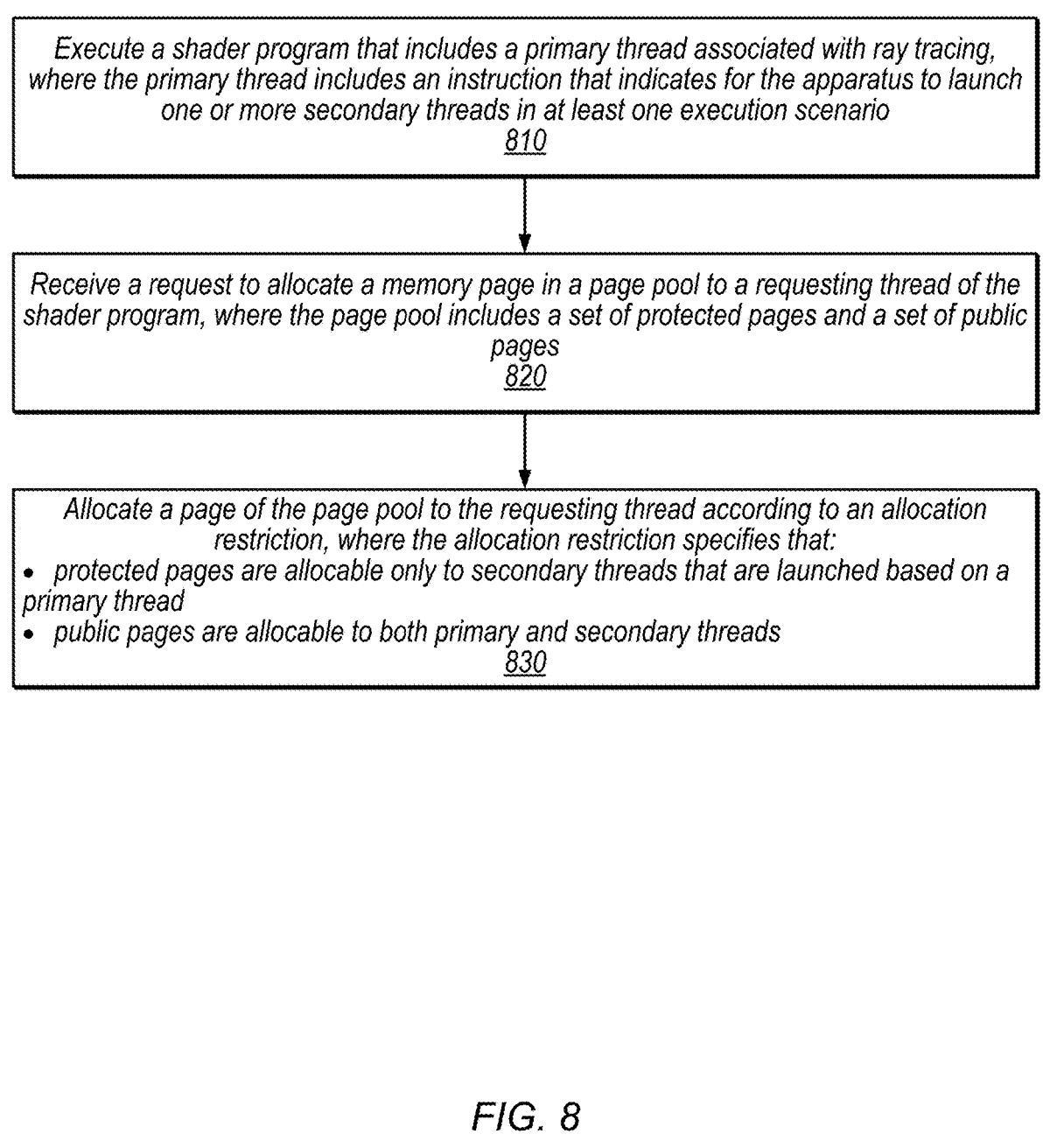

*Execute a shader program that includes a primary thread associated with ray tracing, where the primary thread includes an instruction that indicates for the apparatus to launch one or more secondary threads in at least one execution scenario*
810

*Receive a request to allocate a memory page in a page pool to a requesting thread of the shader program, where the page pool includes a set of protected pages and a set of public pages*
820

*Allocate a page of the page pool to the requesting thread according to an allocation restriction, where the allocation restriction specifies that:*
- *protected pages are allocable only to secondary threads that are launched based on a primary thread*
- *public pages are allocable to both primary and secondary threads*

PAGE MANAGEMENT AND FORWARD PROGRESS FOR RAY TRACING

The present application claims priority to U.S. Provisional App. No. 63/584,021, entitled "Page Management and Forward Progress for Ray Tracing," filed Sep. 20, 2023, the disclosure of which is incorporated by reference herein in its entirety.

BACKGROUND

Technical Field

This disclosure relates generally to graphics processors and more particularly to page management for secondary threads such as ray tracing threads.

Description of Related Art

A graphics processor may manage resources such as memory pages for a large number of threads (e.g., in unified memory architectures). Some threads, referred to as primary threads may conditionally launch other threads, referred to as secondary threads. For example, in the ray tracing context, U.S. patent application Ser. No. 17/103,433 titled "Ray Intersect Circuitry with Parallel Ray Testing" and filed Nov. 24, 2020 discusses implementations in which ray intersect accelerator circuitry may launch single-instruction multiple data (SIMD) group(s) during traversal of an acceleration data structure (ADS) (e.g., to perform an instance transform or to perform a ray/primitive intersect test). Generally, in the context of hybrid hardware/shader ray tracing operations, a primary shader thread may cause secondary threads to be launched for various operations. These secondary threads may provide challenges in allocating resources such as memory pages.

BRIEF DESCRIPTION OF DRAWINGS

FIG. 6 is a diagram illustrating example circuitry configured to detect a potentially blocked request, according to some embodiments.

FIG. 7 is a diagram illustrating example decision logic configured to determine whether to proceed with a current allocation procedure or re-arbitrate, according to some embodiments.

FIG. 8 is a flow diagram illustrating an example method, according to some embodiments.

DETAILED DESCRIPTION

In the unified memory context, for example, circuitry may allocate memory on demand and may manage page pools for different sets of graphics work. Software such as a GPU driver or GPU firmware may configure the page pool to provide pages for cache spills for a given workload. In this context, threads that spawn secondary threads may be challenging from a page management standpoint. For example, there may be deadlock conditions where a primary thread will not complete until its secondary threads complete, but there are insufficient pages currently available in the page pool to execute the secondary threads. Creating a dedicated page pool for secondary threads (e.g., for ray tracing (RT) SIMD groups) could avoid some of these problems, but this approach would duplicate control circuitry and might add undesirable software interaction.

Therefore, GPU hardware separately tracks public and protected pages in the page pool for a given set of graphics work, in some embodiments. Software may determine how many protected pages to set up in the pool, e.g., based on the shader with the greatest memory usage and number of SIMD group IDs (similar to its calculations for the overall page pool). The protected pages are allocable only to secondary threads (e.g., RT threads), which may provide a guarantee of forward progress for that work. For example, the protected pages may be sufficient for at least one ray-triangle test SIMD group and one ray transform SIMD group to make forward progress. If software makes the protected pool bigger than this minimum size, multiple different SIMD groups may use the protected page pool, with tracking logic to determine when to allocate and free pages.

The GPU hardware may also include separate queues (e.g., FIFOs) with different priorities for RT work and non-RT work, which may further improve dependency handling.

Disclosed protected page techniques may advantageously provide forward progress with limited increases in control circuit area.

Even with separate page pools and arbitration FIFOs, there may be additional potential dependency scenarios (e.g., when resource allocation is a multi-cycle procedure). For example, if one non-RT SIMD group (primary) wins arbitration, another non-RT SIMD group that has pages allocated may not be able to release them when it depends on secondary RT SIMD groups that can't launch.

Therefore, in some embodiments, circuitry controls a re-arbitration procedure to rewind allocations for non-RT work when protected pages are available for pending RT work. Note that the resources whose allocations may be rewound may include: private memory, page table pages, virtual hardware IDs, and protected/public pages, for example.

Disclosed rewind techniques may advantageously avoid deadlock scenarios while efficiently arbitrating among different types of threads.

Graphics Processing Overview

Figure 1A:
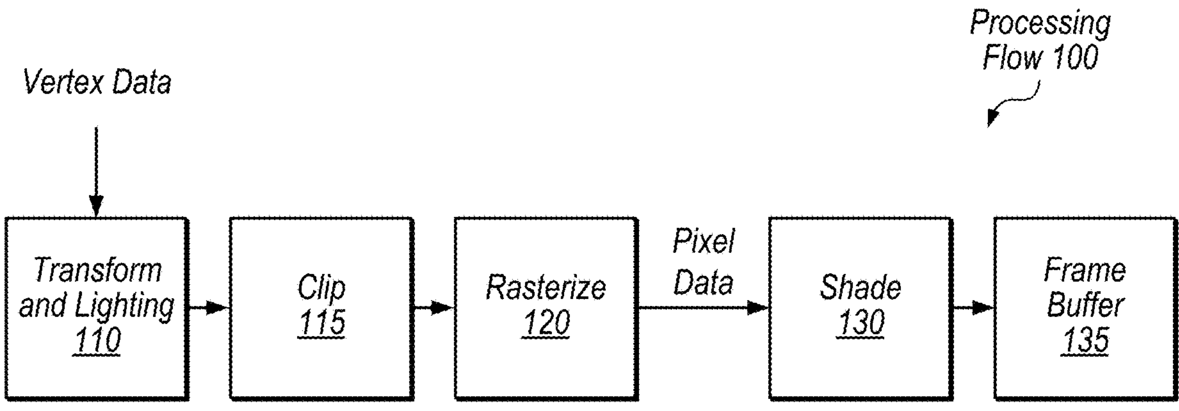
FIG. 1A is a diagram illustrating an overview of example graphics processing operations, according to some embodiments.

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
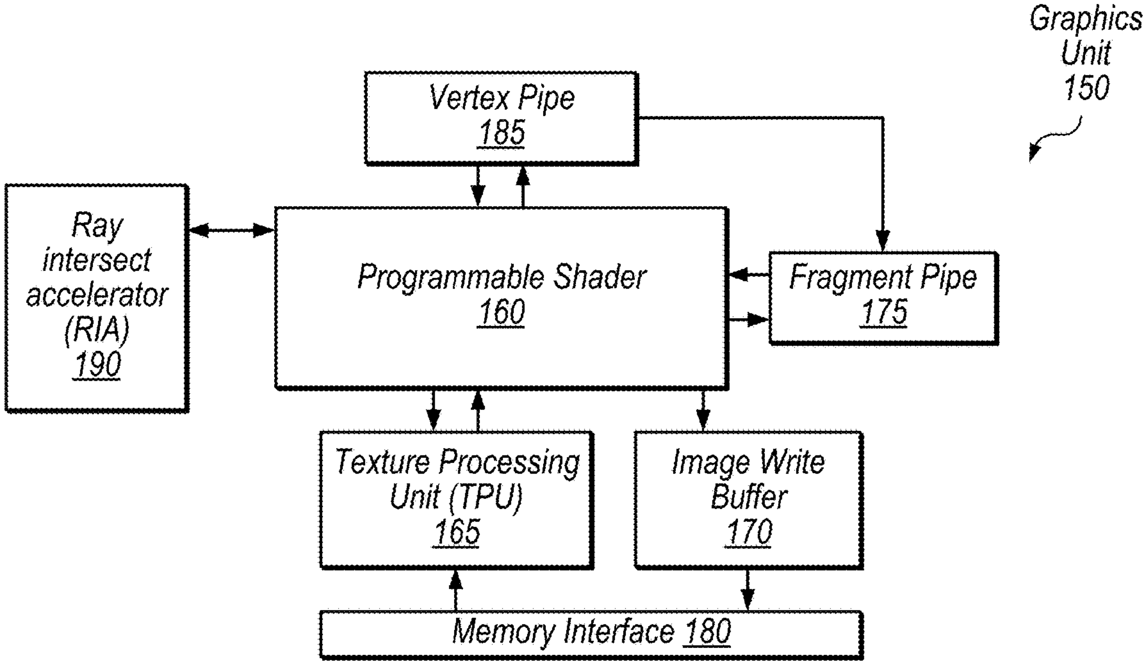
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersection accelerator (RIA) 190, which may include hardware configured to perform various ray intersection operations in response to instruction(s) executed by programmable shader 160, as described in detail below.

Overview of Page Pool With Public and Protected Pages

Figure 2:
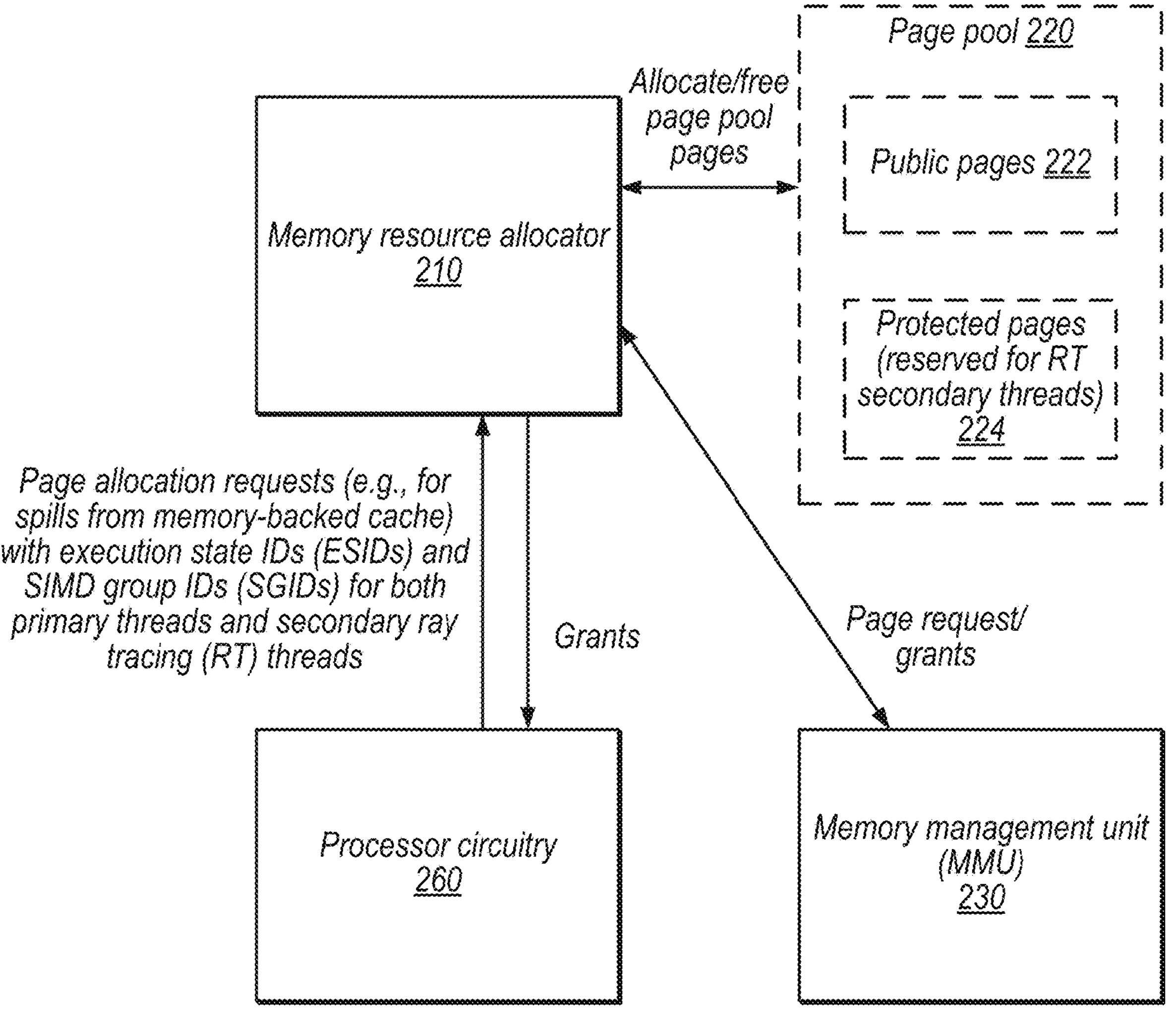
FIG. 2 is a block diagram illustrating allocator circuitry configured to maintain a page pool with both public and protected pages, according to some embodiments.

FIG. 2 is a block diagram illustrating example allocator circuitry configured to maintain a page pool with both public and protected pages, according to some embodiments. In the illustrated example, the computing system includes memory resource allocator 210 (which maintains page pool 220), processor circuitry 260 (which may correspond to programmable shader 160, one or more fixed-function units, or both), and memory management unit (MMU) 230.

Processor circuitry 260, in the illustrated embodiment, is configured to send page allocation requests with execution state identifiers (ESIDs) and SIMD group identifiers (SGIDs) to memory resource allocator 210. The allocation requests may be for pages to handle spills from a memory-backed cache, for example. As shown, the allocation requests may be for both primary threads and secondary threads. As discussed above, threads launched by ray tracing accelerator circuitry are examples of secondary threads. RT threads are discussed herein in the context of various example embodiments, but it is various techniques disclosed in the context of RT threads are contemplated for other types of secondary threads.

Memory resource allocator 210, in the illustrated embodiment, is configured to allocate and free page pool pages in page pool 220. Memory resource allocator 210 may provide page grant indications to processor circuitry 260 based on page allocations and may free pages when they are no longer in use. As shown, memory resource allocator 210 may also communicate with memory management unit 230 to request pages for page pool 220 and receive grants for page pool 220 (therefore, the size of page pool 220 may change over time). Generally, requesting pages from MMU 230 to add to the pool, prior to actual requests, may substantially reduce latency when responding to requests (relative to not maintaining a page pool, for example).

Note that U.S. pat. appl. Ser. No. 16/804,128 titled "On-demand Memory Allocation" and filed Feb. 28, 2020 discusses techniques for allocating memory for private memory spaces in a graphics processor. U.S. patent application Ser. No. 17/660,094 titled "Memory Page Manager" and filed Apr. 21, 2022 discusses page manager circuitry configured to manage page pools (e.g., for use in handling spills from a data cache). The '128 and '094 applications are incorporated by reference herein in their respective entireties. Memory resource allocator 210 may be configured to perform various page management operations discussed in those applications, in the context of embodiments discussed below. For example, memory resource allocator 210 may manage a page pool in the context of translations from private memory space to virtual memory space (and virtual addresses may eventually be translated to physical addresses). In addition to pages allocated for data, pages may also be allocated for translation table information.

Page pool 220, in the illustrated embodiment, includes a set of public pages 222 and a set of protected pages 224. In the illustrated embodiment, the protected pages 224 are reserved for allocation to RT secondary threads. In some embodiments, the public pages 222 are available for allocation to both primary and secondary threads. Note that maintaining a single page pool 220 (in contrast to maintaining separate page pools for primary and secondary threads) may avoid duplicating control circuitry in memory resource allocator 210, while differentiating between public and protected pages in the pool may advantageously provide sufficient page resources for secondary threads to make forward progress.

In some embodiments, the number of protected pages in the page pool 220 is programmable, e.g., via a configuration register. Some graphics kicks may indicate that no protected pages are needed, e.g., when they do not include ray tracing work.

In some embodiments, software (e.g., a graphics driver or firmware) sizes the protected page pool to provide sufficient protected pages for the sum of the greatest allocation for a RT_ESID and for a RT_SGID in the kick. This may guarantee forward progress in the case where non-RT work consumes all of the public pages and then spawns RT work. This size of the page pool ensures that at least one RT_ESID and RT_SGID in the kick can proceed. The memory resource allocator 210 may reserve the protected pages from the pool at the start of the kick, prior to servicing any memory allocation requests from token parser circuitry (discussed in further detail below). In some embodiments in which the number of public pages 222 is dynamic throughout a kick, the number of protected pages 224 may remain fixed for the kick.

Note that the identifiers discussed herein (e.g., SGIDs and ESIDs) may be virtual hardware identifiers, as discussed in detail below. In some embodiments, N physical ESIDs and M physical SGIDs are converted to N+Q virtual ESIDs and M+P virtual SGIDs (and similar conversions are performed for a set of RT_ESIDs and RT_SGIDs), where N, Q, and P are integers.

The protected pages' allocation may often be large enough to allow protected pages to be used by multiple RT_ESIDs and RT_SGIDs. In this context, tracking logic may perform various operations to determine when to allocate and free protected pages. For example, in some embodiments, a group of identifiers shares page table pages (which have mapping information to translate from shader core private addresses to GPU virtual addresses). These page table pages may also be acquired from the page pool. The tracking logic may track allocations from protected pages for such allocations. In particular, private addresses may be hashed and issued to MMU 230 for translation to a virtual address and page table translate page requirements may be calculated.

For a given hashed private memory address, there may be a set of public allocation mask bits and a set of protected allocation mask bits. The number of bits in each set may correspond to the number of identifiers that share page table pages. The protected allocation mask bits may be included only for identifiers in a certain range that are allowed to be mapped for RT work. A certain range of bits within the identifier may correspond to one of the bits in a given set (either in the public or protected set depending on which pool of pages is used to satisfy the request). In some embodiments, priority is given to acquiring protected pages first (e.g., public pages may be used only when protected pages are not available). The allocation mask bits may therefore be used to determine when to add or free a translation table page for a group of identifiers that share page table pages. For example, when the first bit is set in an allocation mask, additional page table translation pages may be allocated and when a virtual identifier is cleared when only one bit is set in an allocation mask, the page table translation pages may be freed.

Generally, disclosed tracking techniques may advantageously allow threads with multiple RT identifiers to use the protected page pool while properly allocating and freeing page table translation pages for private to virtual translations.

Note that while virtualization of identifiers is discussed herein in the context of certain embodiments, various disclosed techniques may be used with non-virtualized identifiers in other embodiments.

Example Dependencies and Forward Progress Techniques

Figure 3:
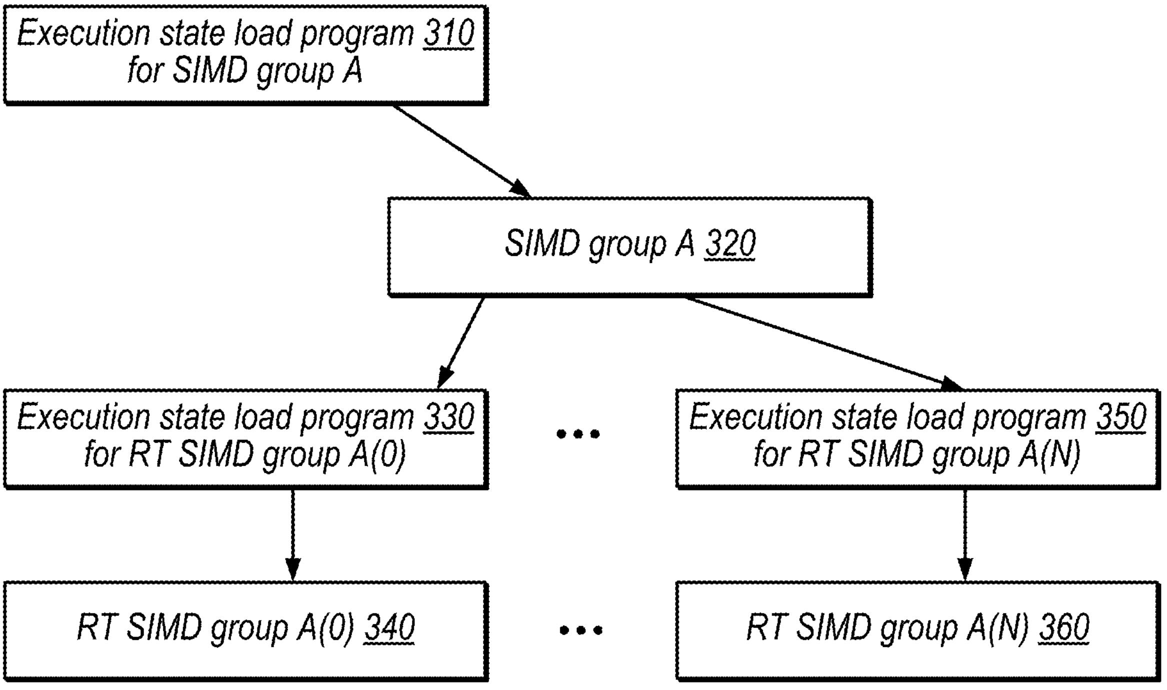
FIG. 3 is a diagram illustrating example dependencies between execution state load programs, primary SIMD groups, and secondary SIMD groups, according to some embodiments.

FIG. 3 is a diagram illustrating example dependencies between execution state load programs, and primary and secondary SIMD groups, according to some embodiments. In the illustrated example, SIMD group A 320 depends on its execution state load program 310 (which has an ESID). Execution state load programs 330 and 350 for RT SIMD groups 340 and 360 in turn depend on SIMD group A 320. RT SIMD groups A(0) 340 through A(N) 360 depend on their respective execution state load programs.

These dependencies may present various potential stall or deadlock conditions if not handled properly. FIGS. 4-7, discussed in detail below, provide example circuitry configured to properly handle at least some of these conditions. In particular, example embodiments discussed below may properly handle situations where a non-RT SIMD group is selected for page allocation, but cannot allocate because another non-RT SIMD group has resources allocated but is waiting for a child RT SIMD group.

In some embodiments, token parser circuitry is configured to generate page allocation requests, e.g., for threads with ESID's, SGIDs, RT_ESIDs, and RT_SGIDs. In some embodiments, ESIDs for execution state load (ESL) programs must complete prior to stating the corresponding shader program associated with an SGID. Therefore, ESIDs may have the highest priority among the types of IDs. ESIDs may also have their own queue to receive higher priority allocation, such that they can bypass SGID allocation requests.

RT_ESIDs could also be sent to the ESID queue, but this could result in deadlock conditions for certain sequences. Therefore, in some embodiments, RT_ESID requests and RT_SGID requests have their own queues. These queues may have higher priority than the corresponding non-RT queues, e.g., because SGIDs that spawn RT work cannot complete until the RT works completes.

Generally, requests may arrive in the following order: first, an ESID allocation request, which may launch an execution state load (ESL) program (e.g., program 310) and which may free its allocated pages when evicted from an execution state cache (e.g., at the end of a kick or due to an eviction based on cache capacity). Then, a coefficient group identifier (CFGID) allocation request (for fragment shaders). Then a SGID allocation request (e.g., for SIMD group A 320) which launches shader programs that could potentially spawn requests to RIA 190 for RT work. Then an RT_ESID allocation request that launches an ESL program (e.g., programs 330 and 350) for an RT_SGID when granted. The RT_ESID request may satisfy its allocation request from the protected portion 224 of the page pool, if sufficient, and may otherwise use pages from public portion 222 of the pool. Then, an RT_SGID request (e.g., for RT SIMD group A(0)) that spawns an RT shader program. The RT_SGID request may similarly satisfy its allocation request from the protected portion of the page pool, if possible and may free its allocated pages when the RT shader program completes.

Figure 4:
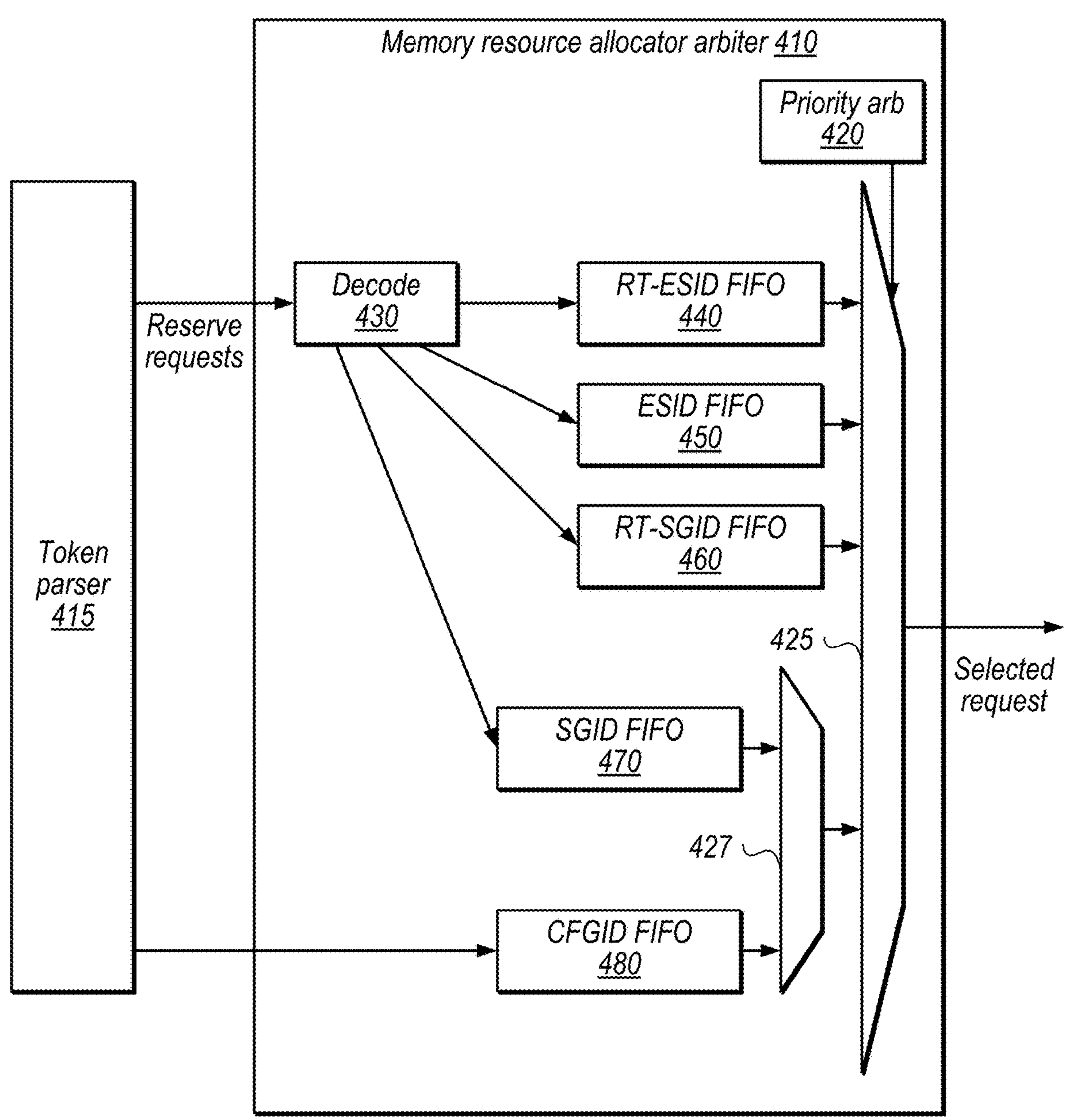
FIG. 4 is a block diagram illustrating example memory resource allocator arbiter circuitry, according to some embodiments.

FIG. 4 is a block diagram illustrating example memory resource allocator arbiter circuitry, according to some embodiments. In the illustrated example, token parser circuitry 415 transmits resource reservation requests to memory resource allocator arbiter 410, which arbitrates to select a request from among multiple FIFO queues. Note that the circuitry of FIGS. 4 and 5 may be included in processor circuitry 260, in some embodiments, and may send requests to memory resource allocator 210 for page allocations after allocating virtual hardware identifiers for requests.

Token parser 415, in some embodiments, is configured to receive work tokens from multiple data controllers (e.g., a compute data controller, vertex data controller, and pixel data controller), form SIMD groups, and interact with allocation circuitry to allocate pages for private memory. Token parser 415 may initialize SIMD group and threadgroup state in a data cache prior to launching a SIMD group.

Memory resource allocator arbiter 410, in the illustrated embodiment, includes priority arbitration circuitry 420, decode circuitry 430, RT_ESID first-in-first-out (FIFO) circuitry 440, ESID FIFO 450, RT_SGID FIFO 460, SGID_FIFO 470, CFGID FIFO 480, multiplexer (MUX) 427, and multiplexer 425.

Decode circuitry 430, in the illustrated example, is configured to decode a given reserve request and route it to the proper FIFO.

Priority arbitration circuitry 420, in the illustrated example, is configured to arbitrate among the FIFOs and provide MUX control signals to MUXes 425 and 427 to select the winning FIFO in a given cycle (note that arbitration may not occur every cycle, e.g., it may wait for downstream hardware to indicate readiness for a new request). In some embodiments, FIFO 440 has the highest priority, followed by FIFO 450, then FIFO 460, then either FIFO 470 or 480. Note that the separate queues for RT requests may advantageously reduce or avoid deadlock scenarios, even though those requests may share a page pool with non-RT work as discussed above.

Note that the CFGID FIFO 480 may be for coefficient group allocation requests for fragment shaders. These may be granted prior to subsequent SGID allocation requests (and may be on a separate interface to allow early prefetch). These allocation requests may have initial priority over SGID requests unless the previously-accepted allocation request was granted for a CFGID (in which case the SGID allocation has priority). Therefore, circuitry 420 may provide round robin arbitration between FIFOs 470 and 480 until a request from FIFO 440, 450, or 460 is granted, at which point priority may be reset to FIFO 480.

Consider the following potential deadlock scenario in the context of FIG. 4 (and note that example solutions to this scenario are discussed below with reference to FIG. 5). A SGID[a] request receives an allocation from public pages (and is dependent on one or more RT_SGID[a][*] completing). SGID[b] uses all available public pages to satisfy its request (and is dependent on one or more RT_SGID[b][*] completing). RT_ESID[a] receives its allocation. RT_SGID [a][0] receives its allocation from protected pages. SGID[c] wins arbitration in circuitry 410, but no public pages are available.

A subsequent RT_SGID[a][1] request is stuck behind the SGID[c] request, SGID[a] cannot complete and free pages until RT_SGID[a][1] completes (and SGID[b] may likewise be dependent on a spawned RT_ESID [b]). At this point, a deadlock could occur because arbitration circuitry 420 has selected the SGID[c] request and is blocking other requests, but pages will not be freed for SGID[c] until the blocked RT requests can complete. RT_SGID[a][0] will eventually complete and make protected pages available from the pool. However, RT_SGID[a][1] is still stuck behind the non-granted SGID[c] that needs public pages to be freed; therefore, it cannot access the available protected pages. Similar situations may occur where a SGID blocks an RT_ESID or RT_SGID, a CFGID blocks an RT_ESID or RT_SGID, or an ESID blocks an RT_ESID or RT_SGID.

Therefore, in some embodiments, the arbiter circuitry 410 may switch to a higher-priority RT request, unwinding any allocation work already performed in an intelligent manner (e.g., using circuitry that also supports kick preemption, for example), as discussed in detail below.

Figure 5:
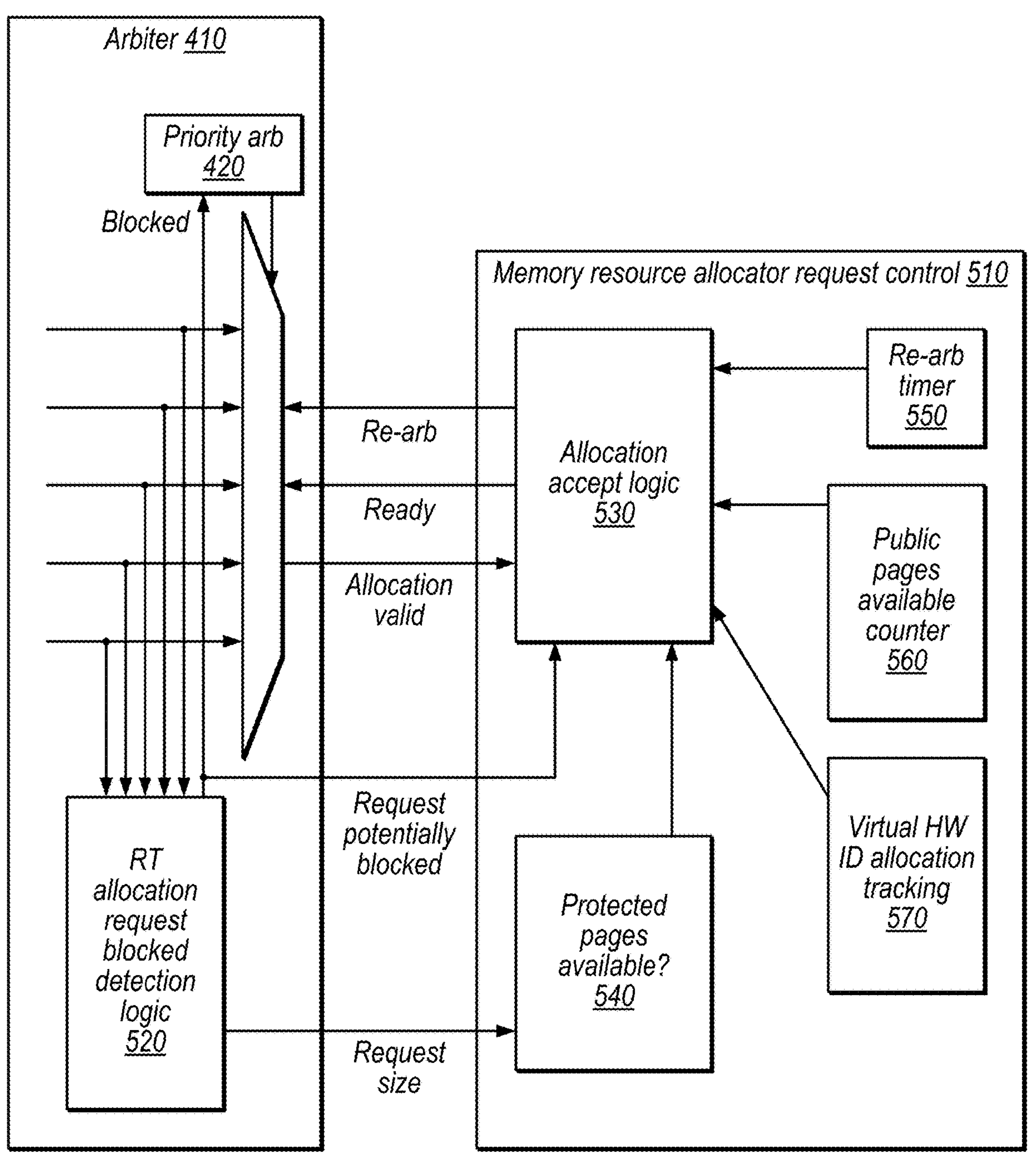
FIG. 5 is a block diagram illustrating example request control circuitry configured to handle requests from arbiter circuitry and trigger re-arbitration in certain scenarios, according to some embodiments.

FIG. 5 is a block diagram illustrating example request control circuitry configured to handle requests from the arbiter circuitry and trigger re-arbitration in certain scenarios, according to some embodiments. In the illustrated example, arbiter 410 includes RT allocation request blocked detection logic 520 (a detailed example of which is provided in FIG. 6), in addition to priority arbiter 420.

Memory resource allocator request control circuitry 510, in the illustrated embodiment, is configured to assign virtual hardware IDs and calculate page requirements for requests than win arbitration at arbiter 410. In the illustrated example, control circuitry 510 includes allocation accept logic 530, protected pages available circuitry 540, re-arbitration timer 550, public pages available counter 560, and virtual hardware ID allocation tracking circuitry 570.

Allocation accept logic 530, in some embodiments, is configured to allocate virtual hardware identifiers to requests and calculate page requirements. This may take multiple clock cycles (and the number of clock cycles may vary, e.g., depending on the type of allocation request). A given request type may have its own page allocation requirements and may also use additional page table translation pages depending on which virtual hardware IDs are selected. Therefore, disclosed solutions may wait for control circuitry 510 to be ready to accept an updated request before re-arbitrating (e.g., able to undo its identifier allocations and cancel its calculated page requirements).

In some embodiments, logic in control circuitry 510 may support preemption of a kick on a context store. At a high level, if there is a pending request that is not being satisfied and the kick is preempted, circuitry 510 may drop the pending request and return its state to the state prior to the pending request (as if the request was never seen). This logic may also be used to drop an allocation request and re-arbitrate at circuitry 410. Note that arbiter 410 may drop a preempted request but may keep a re-arbitrated request to be issued again eventually.

Block detection logic 520, in some embodiments, is configured to send a “request potentially blocked” signal to allocation accept logic 530 under certain conditions. Note that logic 520 may not actually know whether a request is blocked, but may indicate that a request could be blocked (e.g., when there is a pending RT_ESID or RT_SGID allocation request but arbiter 410 is currently locked on to an ESID, CFG, or SGID request). Logic 520 also provides a request size for the blocked request to circuitry 540, in this example.

Allocation accept logic 530 may then be configured to detect a scenario in which it likely cannot grant the pending request but it could grant a pending RT request (e.g., because sufficient pages in the protected pool portion 224 are available, as reported by circuitry 540). In this scenario, logic 530 may internally preempt the current request and send a re-arbitration signal to arbiter 410. Note that arbiter 410 does not drop the current request, but selects another request instead (e.g., an RT request) and the current request returns to its FIFO. Arbiter 410 may assert the allocation valid signal once the new request is ready.

In some embodiments, logic 530 is configured to re-arbitrate only after expiration of re-arbitration timer 550.

This may allow waiting a configurable number of clock cycles to infer that public pages will not become available to service the current request, before initiating re-arbitration. The timer may start when the current request is received, for example.

As shown, allocation accept logic 530 may utilize the public pages available counter 560 to determine whether sufficient pages are available for the current request and may use virtual hardware ID allocation tracking circuitry 570 to track and assign identifiers to requests.

FIG. 6 is a diagram illustrating example circuitry configured to detect a potentially blocked request, according to some embodiments. In the illustrated example, AND gate 610 receives inputs indicating (A) whether an ESID, CFG, or SGID request is selected by circuitry 410 and (B) whether an RT_ESID, RT_SGID request is waiting (e.g., in a FIFO of circuitry 410). If both inputs are true, the output of logic 520 indicates that the current request is potentially blocked and may not be able to obtain its desired resources. Although an AND gate is shown for purposes of illustration, various appropriate block detection logic may be implemented in other embodiments.

FIG. 7 is a diagram illustrating example decision logic configured to determine whether to re-arbitrate, according to some embodiments. In some embodiments, logic 710 is included in logic 530.

In the illustrated embodiment, logic 710 receives inputs that indicate: whether a request is potentially blocked (e.g., the output of logic 520), whether sufficient protected pages are available (e.g., the output of circuitry 540), whether circuitry 510 is able to grant the pending selected request (e.g., based on the number of public pages currently in the pool), and whether the re-arbitration timer has expired. In some embodiments, logic 710 is configured to output a re-arbitration signal if all of its inputs are true (e.g., may be implemented using an AND gate).

Example Method

FIG. 8 is a flow diagram illustrating an example method for providing a page pool with public and protected pages, according to some embodiments. The method shown in FIG. 8 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 810, in the illustrated embodiment, a graphics processor (e.g., using programmable shader 160) executes a shader program that includes a primary thread associated with ray tracing, where the primary thread includes an instruction that indicates for the apparatus to launch one or more secondary threads in at least one execution scenario. Example execution scenarios include reaching a transform node or a leaf node in an ADS. Note that in other embodiments, disclosed techniques may be utilized for secondary threads that are spawned for non-RT reasons. Ray tracing is discussed herein for purposes of illustration but is not intended to limit the scope of the present disclosure.

In some embodiments, the processor also executes threads that cannot spawn secondary threads (e.g., non-RT threads). These threads may always receive allocations from the public portion of the page pool.

In some embodiments, the processor includes ray intersect accelerator circuitry (e.g., RIA 190) and the instruction is a ray intersect command for the ray intersect circuitry. In response to the instruction, the ray intersect circuitry may: traverse an acceleration data structure and launch the one or more secondary threads based on the traversal. The one or more secondary threads may include instructions that specify at least one operation of the following types of operations: ray transforms and primitive intersection tests.

In some embodiments, the processor is configured to assign pages from the page pool to both execution state load threads and shader program threads. In some embodiments, the processor is configured to translate private addresses from the processor circuitry to virtual addresses corresponding to the page pool and is also configured to translate virtual addresses to physical addresses in memory. In some embodiments, the apparatus is configured to virtualize identifiers for the primary thread and for the one or more secondary threads.

At 820, in the illustrated embodiment, the processor (e.g., memory resource allocator circuitry 210) receives a request to allocate a memory page in a page pool to a requesting thread of the shader program, where the page pool includes a set of protected pages and a set of public pages.

At 830, in the illustrated embodiment, the processor allocates a page of the page pool to the requesting thread according to an allocation restriction, where the allocation restriction specifies that: protected pages are allocable only to secondary threads that are launched based on a primary thread and public pages are allocable to both primary and secondary threads.

In some embodiments, the apparatus implements a unified memory architecture in which one or more caches of the processor circuitry are memory backed and pages allocated to a given thread from the page pool provide backing memory for spills from the one or more caches.

In some embodiments, memory resource allocator circuitry is configured to determine a number of pages in the set of protected pages in the page pool based on software-specified configuration information for a kick of graphics work that includes the primary thread. In some embodiments, the memory resource allocator circuitry is configured to assign pages from the set of protected pages to multiple different single-instruction multiple-data (SIMD groups) of the one or more secondary threads, during a time interval. The allocator may use an allocation tracking array to determine when to free pages.

In some embodiments, the processor includes buffer circuitry that implements separate buffers (e.g., the FIFOs of FIG. 4) for allocation requests from: primary threads, secondary threads, and execution state load threads. Arbitration circuitry (e.g., arbiter 410) may select from among buffered allocation requests for allocation of resources (e.g., based on buffer priorities). In some embodiments, request control circuitry (e.g., circuitry 510) assigns resources to threads whose allocation requests were selected by the arbitration circuitry. In some embodiments, re-arbitration circuitry de-allocates resources assigned to one or more threads and re-selects from among buffered allocation requests based on detection of a block scenario.

The re-arbitration circuitry may detect the block scenario based on: selection of a given thread by the arbitration circuitry that is not a secondary thread in a situation where a primary ray tracing thread has a request eligible for arbitration, a sufficient number of protected pages being available for the primary ray tracing thread, and a determination that the request control circuitry does not have sufficient resources to assign resources to the given thread.

The re-arbitration circuitry may further detect the block scenario based on expiration of a re-arbitration timer.

Multiple "kicks" may be executed to render a frame of graphics data. In some embodiments, a kick is a unit of work from a single context that may include multiple threads to be executed (and may potentially include other types of graphics work that is not performed by a shader). A kick may not provide any assurances regarding memory synchronization among threads (other than specified by the threads themselves), concurrency among threads, or launch order among threads. In some embodiments, a kick may be identified as dependent on the results of another kick, which may allow memory synchronization without requiring hardware memory coherency support. Typically, graphics firmware or hardware programs configuration registers for each kick before sending the work to the pipeline for processing. Often, once a kick has started, it does not access a memory hierarchy past a certain level until the kick is finished (at which point results may be written to another level in the hierarchy). Information for a given kick may include state information, location of shader program(s) to execute, buffer information, location of texture data, available address spaces, etc. that are needed to complete the corresponding graphics operations. Graphics firmware or hardware may schedule kicks and detect an interrupt when a kick is complete, for example. In some embodiments, portions of a graphics unit are configured to work on a single kick at a time. This set of resources may be referred to as a "kickslot." Thus, in some embodiments, any data that is needed for a given kick is read from memory that is shared among multiple processing elements at the beginning of the kick and results are written back to shared memory at the end of the kick. Therefore, other hardware may not see the results of the kick until completion of the kick, at which point the results are available in shared memory and can be accessed by other kicks (including kicks from other data masters). A kick may include a set of one or more rendering commands, which may include a command to draw procedural geometry, a command to set a shadow sampling method, a command to draw meshes, a command to retrieve a texture, a command to perform generation computation, etc. A kick may be executed at one of various stages during the rendering of a frame. Examples of rendering stages include, without limitation: camera rendering, light rendering, projection, texturing, fragment shading, etc. Kicks may be scheduled for compute work, vertex work, or pixel work, for example.

In some embodiments, a graphics driver maps a new kick to one of multiple kickslots. Each kickslot may include a set of configuration registers and may have a context ID that indicates a mapping between the kick's virtual addresses and physical addresses.

Example Device

Figure 9:
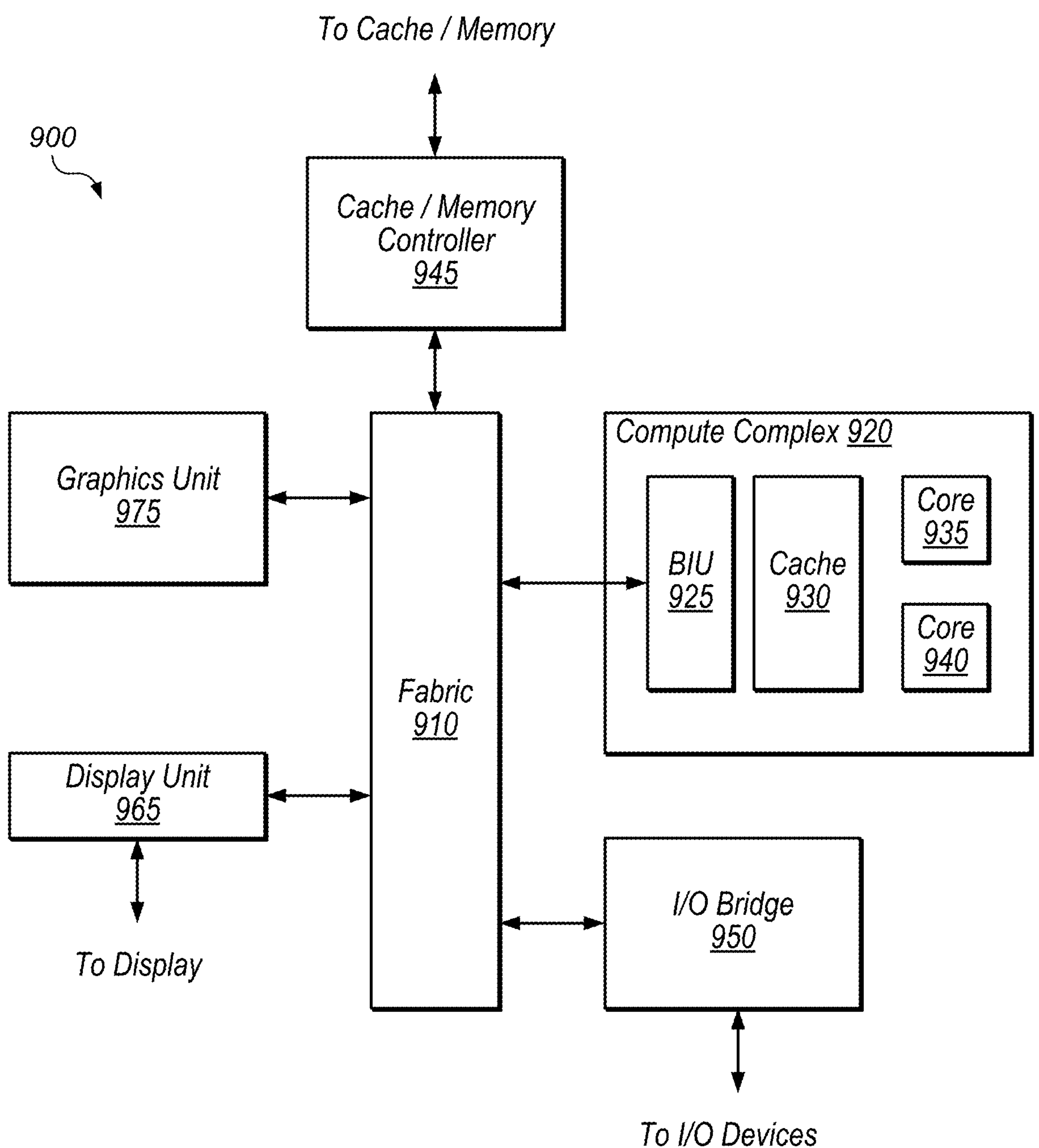
FIG. 9 is a block diagram illustrating an example computing device, according to some embodiments.

Referring now to FIG. 9, a block diagram illustrating an example embodiment of a device 900 is shown. In some embodiments, elements of device 900 may be included within a system on a chip. In some embodiments, device 900 may be included in a mobile device, which may be battery-powered. Therefore, power consumption by device 900 may be an important design consideration. In the illustrated embodiment, device 900 includes fabric 910, compute complex 920 input/output (I/O) bridge 950, cache/memory controller 945, graphics unit 975, and display unit 965. In some embodiments, device 900 may include other components (not shown) in addition to or in place of the illustrated components, such as video processor encoders and decoders, image processing or recognition elements, computer vision elements, etc.

Fabric 910 may include various interconnects, buses, MUX's, controllers, etc., and may be configured to facilitate communication between various elements of device 900. In some embodiments, portions of fabric 910 may be configured to implement various different communication protocols. In other embodiments, fabric 910 may implement a single communication protocol and elements coupled to fabric 910 may convert from the single communication protocol to other communication protocols internally.

In the illustrated embodiment, compute complex 920 includes bus interface unit (BIU) 925, cache 930, and cores 935 and 940. In various embodiments, compute complex 920 may include various numbers of processors, processor cores and caches. For example, compute complex 920 may include 1, 2, or 4 processor cores, or any other suitable number. In one embodiment, cache 930 is a set associative L2 cache. In some embodiments, cores 935 and 940 may include internal instruction and data caches. In some embodiments, a coherency unit (not shown) in fabric 910, cache 930, or elsewhere in device 900 may be configured to maintain coherency between various caches of device 900. BIU 925 may be configured to manage communication between compute complex 920 and other elements of device 900. Processor cores such as cores 935 and 940 may be configured to execute instructions of a particular instruction set architecture (ISA) which may include operating system instructions and user application instructions. These instructions may be stored in computer readable medium such as a memory coupled to memory controller 945 discussed below.

As used herein, the term "coupled to" may indicate one or more connections between elements, and a coupling may include intervening elements. For example, in FIG. 9, graphics unit 975 may be described as "coupled to" a memory through fabric 910 and cache/memory controller 945. In contrast, in the illustrated embodiment of FIG. 9, graphics unit 975 is "directly coupled" to fabric 910 because there are no intervening elements.

Cache/memory controller 945 may be configured to manage transfer of data between fabric 910 and one or more caches and memories. For example, cache/memory controller 945 may be coupled to an L3 cache, which may in turn be coupled to a system memory. In other embodiments, cache/memory controller 945 may be directly coupled to a memory. In some embodiments, cache/memory controller 945 may include one or more internal caches. Memory coupled to controller 945 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 945 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 920 to cause the computing device to perform functionality described herein.

Graphics unit 975 may include one or more processors, e.g., one or more graphics processing units (GPUs). Graphics unit 975 may receive graphics-oriented instructions, such as OPENGL®, Metal®, or DIRECT3D® instructions, for example. Graphics unit 975 may execute specialized GPU instructions or perform other operations based on the received graphics-oriented instructions. Graphics unit 975 may generally be configured to process large blocks of data in parallel and may build images in a frame buffer for output to a display, which may be included in the device or may be a separate device. Graphics unit 975 may include transform, lighting, triangle, and rendering engines in one or more graphics processing pipelines. Graphics unit 975 may output pixel information for display images. Graphics unit 975, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may improve performance, reduce power consumption, reduce chip area, etc. for certain graphics workloads (e.g., workloads with ray tracing work for hybrid hardware/shader ray tracing architecture).

Display unit 965 may be configured to read data from a frame buffer and provide a stream of pixel values for display. Display unit 965 may be configured as a display pipeline in some embodiments. Additionally, display unit 965 may be configured to blend multiple frames to produce an output frame. Further, display unit 965 may include one or more interfaces (e.g., MIPI® or embedded display port (eDP)) for coupling to a user display (e.g., a touchscreen or an external display).

I/O bridge 950 may include various elements configured to implement: universal serial bus (USB) communications, security, audio, and low-power always-on functionality, for example. I/O bridge 950 may also include interfaces such as pulse-width modulation (PWM), general-purpose input/output (GPIO), serial peripheral interface (SPI), and inter-integrated circuit (I2C), for example. Various types of peripherals and devices may be coupled to device 900 via I/O bridge 950.

In some embodiments, device 900 includes network interface circuitry (not explicitly shown), which may be connected to fabric 910 or I/O bridge 950. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 900 with connectivity to various types of other devices and networks.

Example Applications

Figure 10:
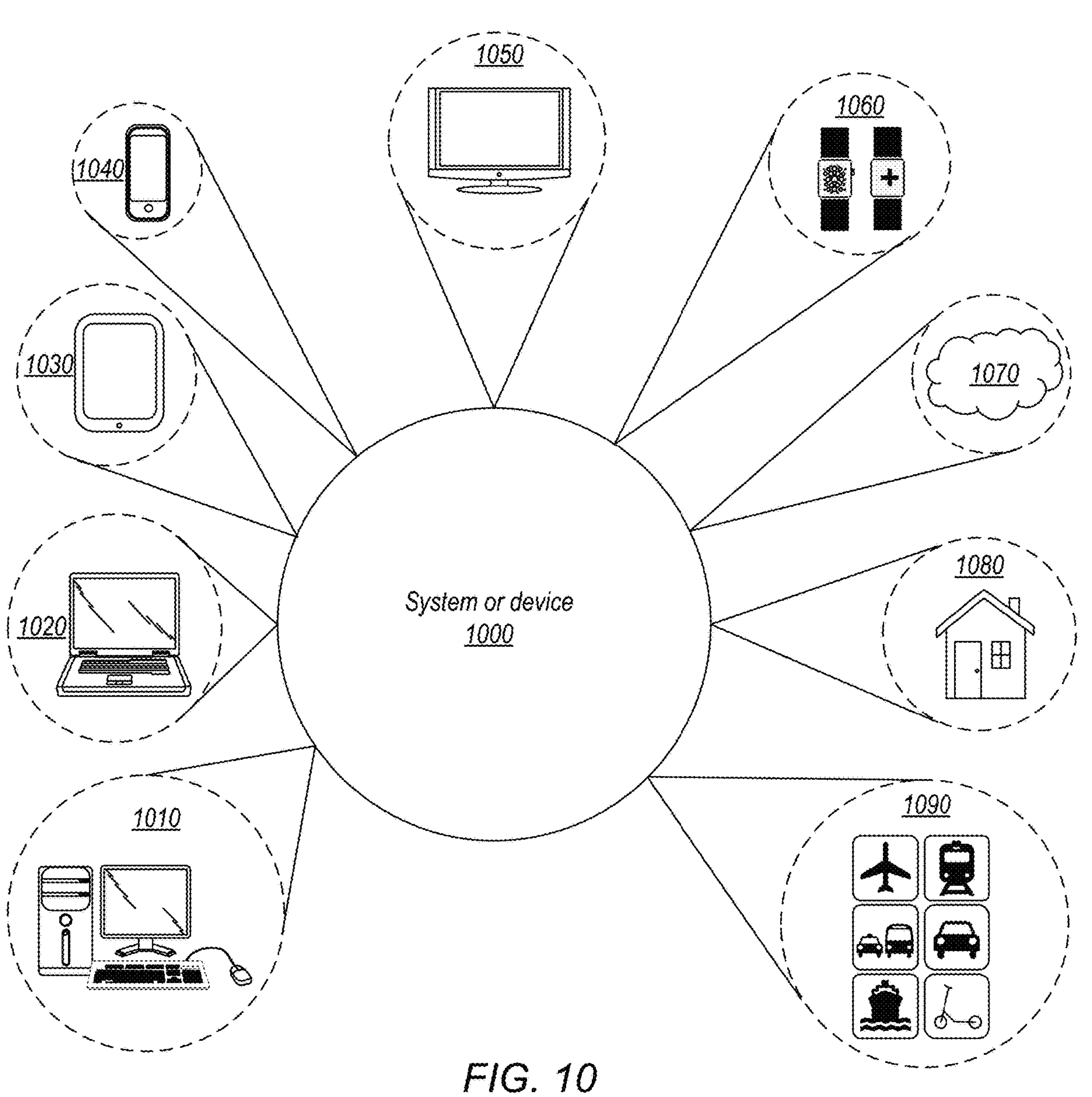
FIG. 10 is a diagram illustrating example applications of disclosed systems and devices, according to some embodiments.

Turning now to FIG. 10, various types of systems that may include any of the circuits, devices, or system discussed above. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 11:
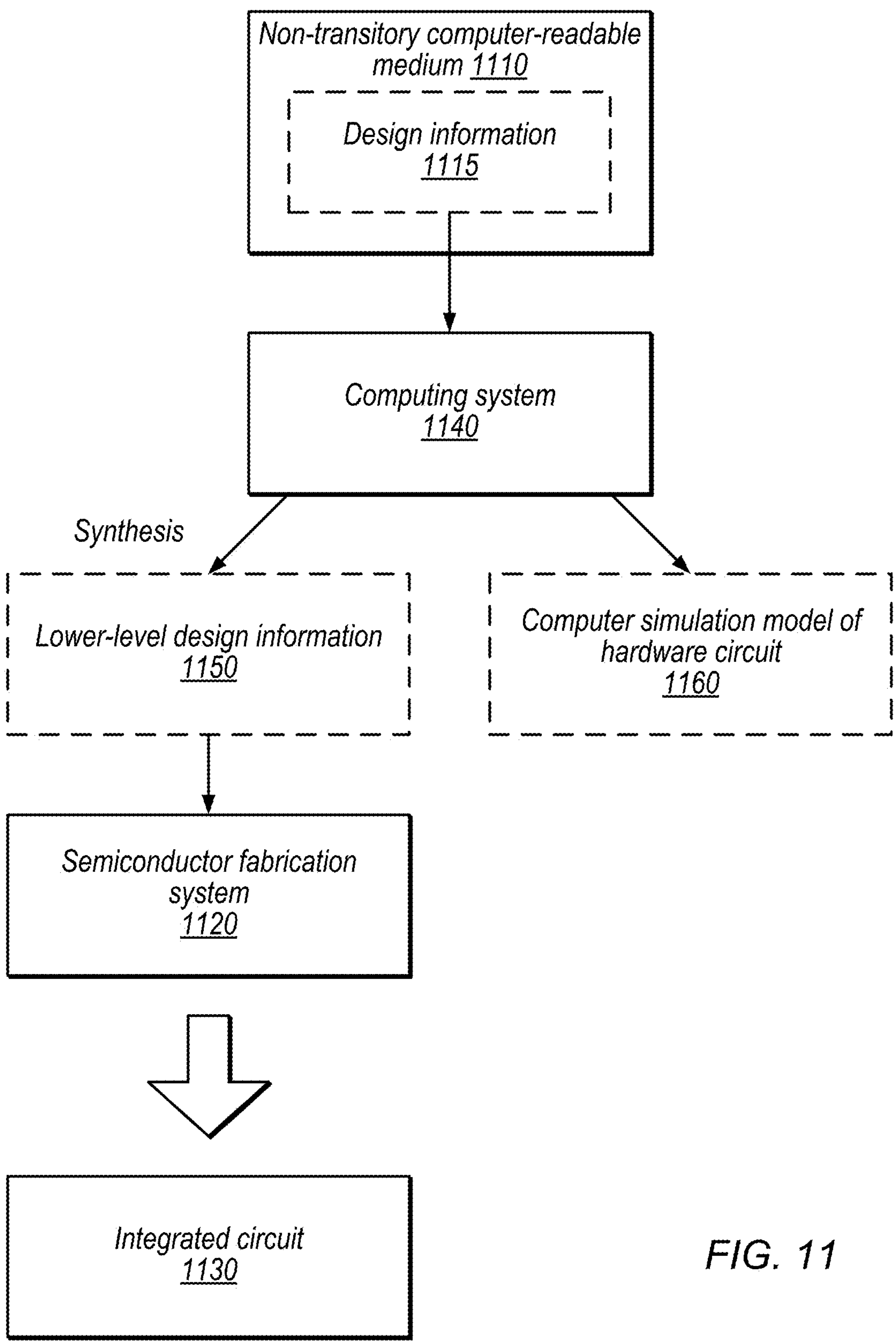
FIG. 11 is a block diagram illustrating an example computer-readable medium that stores circuit design information, according to some embodiments.

FIG. 11 is a block diagram illustrating an example non-transitory computer-readable storage medium that stores circuit design information, according to some embodiments. In the illustrated embodiment, computing system 1140 is configured to process the design information. This may include executing instructions included in the design information, interpreting instructions included in the design information, compiling, transforming, or otherwise updating the design information, etc. Therefore, the design information controls computing system 1140 (e.g., by programming computing system 1140) to perform various operations discussed below, in some embodiments.

In the illustrated example, computing system 1140 processes the design information to generate both a computer simulation model of a hardware circuit 1160 and lower-level design information 1150. In other embodiments, computing system 1140 may generate only one of these outputs, may generate other outputs based on the design information, or both. Regarding the computing simulation, computing system 1140 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1140 also processes the design information to generate lower-level design information 1150 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1150 (potentially among other inputs), semiconductor fabrication system 1120 is configured to fabricate an integrated circuit 1130 (which may correspond to functionality of the simulation model 1160). Note that computing system 1140 may generate different simulation models based on design information at various levels of description, including information 1150, 1115, and so on. The data representing design information 1150 and model 1160 may be stored on medium 1110 or on one or more other media.

In some embodiments, the lower-level design information 1150 controls (e.g., programs) the semiconductor fabrication system 1120 to fabricate the integrated circuit 1130. Thus, when processed by the fabrication system, the design information may program the fabrication system to fabricate a circuit that includes various circuitry disclosed herein.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Accordingly, non-transitory computer-readable storage medium 1110 may include two or more memory media; such media may reside in different locations—for example, in different computer systems that are connected over a network.

Design information 1115 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1140, semiconductor fabrication system 1120, or both. In some embodiments, design information may also include one or more cell libraries that specify the synthesis, layout, or both of integrated circuit 1130. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1130 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 and model 1160 are configured to operate according to a circuit design specified by design information 1115, which may include performing any of the functionality described herein. For example, integrated circuit 1130 may include any of various elements shown in FIGS. 1B, 2, 4-7, and 9. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1120 to fabricate integrated circuit 1130.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:

processor circuitry configured to execute a shader program that includes a primary thread associated with ray tracing, wherein the primary thread includes an instruction that indicates for the apparatus to launch one or more secondary threads in at least one execution scenario; and memory resource allocator circuitry configured to:

receive a request to allocate a memory page in a page pool to a requesting thread of the shader program, wherein the page pool includes a set of protected pages and a set of public pages; and allocate a page of the page pool to the requesting thread according to an allocation restriction, wherein the allocation restriction specifies that:

protected pages are allocable only to secondary threads that are launched based on a primary thread; and public pages are allocable to both primary and secondary threads.

2. The apparatus of claim 1, wherein:

the apparatus includes ray intersect accelerator circuitry;

the instruction is a ray intersect command for the ray intersect accelerator circuitry, in response to which the ray intersect accelerator circuitry is configured to:

traverse an acceleration data structure; and launch the one or more secondary threads based on the traversal, wherein the one or more secondary threads include instructions that specify at least one operation of the following types of operations:

ray transforms; and primitive intersection tests.

3. The apparatus of claim 1, wherein:

the apparatus implements a unified memory architecture in which one or more caches of the processor circuitry are memory backed; and pages allocated to a given thread from the page pool provide backing memory for spills from the one or more caches.

4. The apparatus of claim 1, wherein the memory resource allocator circuitry is configured to determine a number of pages in the set of protected pages in the page pool based on software-specified configuration information for a kick of graphics work that includes the primary thread.

5. The apparatus of claim 1, wherein the memory resource allocator circuitry is configured to assign pages from the set of protected pages to multiple different single-instruction multiple-data (SIMD) groups of the one or more secondary threads, during a time interval.

6. The apparatus of claim 1, wherein the memory resource allocator circuitry is configured to assign pages from the page pool to both execution state load threads and shader program threads.

7. The apparatus of claim 1, wherein the apparatus is configured to translate private addresses from the processor circuitry to virtual addresses corresponding to the page pool and configured to translate virtual addresses to physical addresses in memory.

8. The apparatus of claim 1, wherein the apparatus is configured to virtualize identifiers for the primary thread and for the one or more secondary threads.

9. The apparatus of claim 1, wherein the memory resource allocator circuitry includes:

buffer circuitry that implements separate buffers for allocation requests from:

primary threads;

secondary threads; and execution state load threads;

arbitration circuitry configured to select from among buffered allocation requests for allocation of resources;

request control circuitry configured to assign resources to threads whose allocation requests were selected by the arbitration circuitry; and re-arbitration circuitry configured to de-allocate resources assigned to one or more threads and re-select from among the buffered allocation requests based on detection of a block scenario.

10. The apparatus of claim 9, wherein the re-arbitration circuitry is configured to detect the block scenario based on:

selection of a given thread by the arbitration circuitry that is not a secondary thread in a situation where a primary ray tracing thread has a request eligible for arbitration;

a sufficient number of protected pages being available for the primary ray tracing thread; and a determination that the request control circuitry does not have sufficient resources to assign resources to the given thread.

11. The apparatus of claim 10, wherein the re-arbitration circuitry is further configured to detect the block scenario based on:

expiration of a re-arbitration timer.

12. The apparatus of claim 1, wherein the apparatus is a computing device that further includes:

a central processing unit;

a display; and network interface circuitry.

13. A method, comprising:

executing, by a computing system, a shader program that includes a primary thread associated with ray tracing, wherein the primary thread includes an instruction that indicates for the computing system to launch one or more secondary threads in at least one execution scenario;

receiving, by the computing system, a request to allocate a memory page in a page pool to a requesting thread of the shader program, wherein the page pool includes a set of protected pages and a set of public pages; and allocating, by the computing system, a page of the page pool to the requesting thread according to an allocation restriction, wherein the allocation restriction specifies that:

protected pages are allocable only to secondary threads that are launched based on a primary thread; and public pages are allocable to both primary and secondary threads.

14. The method of claim 13, wherein the one or more secondary threads are launched by ray intersect accelerator circuitry based on traversal of a bounding volume hierarchy.

15. The method of claim 13, wherein the computing system implements a unified memory architecture in which one or more caches of the computing system are memory backed and the method further comprises utilizing one or more pages from the page pool for spill data from the one or more caches.

16. The method of claim 13, further comprising:

determining, by the computing system, a number of pages for inclusion in the set of protected pages in the page pool based on software-specified configuration information for a kick of graphics work that includes the primary thread.

17. The method of claim 13, further comprising:

de-allocating, by the computing system, pages assigned to one or more threads and re-selecting from among buffered allocation requests based on detection of a block scenario.

18. A non-transitory computer-readable medium having instructions of a hardware description programming language stored thereon that, when processed by a computing system, program the computing system to generate a computer simulation model, wherein the model represents a hardware circuit that includes:

processor circuitry configured to execute a shader program that includes a primary thread associated with ray tracing, wherein the primary thread includes an instruction that indicates for the circuit to launch one or more secondary threads in at least one execution scenario; and memory resource allocator circuitry configured to:

receive a request to allocate a memory page in a page pool to a requesting thread of the shader program, wherein the page pool includes a set of protected pages and a set of public pages; and allocate a page of the page pool to the requesting thread according to an allocation restriction, wherein the allocation restriction specifies that:

protected pages are allocable only to secondary threads that are launched based on a primary thread; and public pages are allocable to both primary and secondary threads.

19. The non-transitory computer-readable medium of claim 18, wherein:

the circuit includes ray intersect accelerator circuitry;

the instruction included in the primary thread is a ray intersect command for the ray intersect accelerator circuitry, in response to which the ray intersect accelerator circuitry is configured to:

traverse an acceleration data structure; and launch the one or more secondary threads based on the traversal, wherein the one or more secondary threads include instructions that specify at least one operation of the following types of operations:

ray transforms; and primitive intersection tests.

20. The non-transitory computer-readable medium of claim 18, wherein:

the circuit implements a unified memory architecture in which one or more caches of the processor circuitry are memory backed; and pages allocated to a given thread from the page pool provide backing memory for spills from the one or more caches.

* * * * *